United States Patent
Mizrahi et al.

(10) Patent No.: US 7,985,438 B2
(45) Date of Patent: Jul. 26, 2011

(54) METHOD FOR THE PRODUCTION OF INTEGRALLY FLAVORED NON-FRIED SNACKS

(75) Inventors: Simón Sacal Mizrahi, Del. Miguel Hidalgo (MX); Marcos Baez Fernández, Coyoacán (MX)

(73) Assignee: IHS Global S.A.P.I. De C.V., Mexico, D.F. (MX)

( * ) Notice: Subject to any disclaimer, the term of this patent is extended or adjusted under 35 U.S.C. 154(b) by 104 days.

(21) Appl. No.: 11/792,088

(22) PCT Filed: Dec. 1, 2005

(86) PCT No.: PCT/MX2005/000111
§ 371 (c)(1),
(2), (4) Date: Jun. 1, 2007

(87) PCT Pub. No.: WO2006/059892
PCT Pub. Date: Jun. 8, 2006

(65) Prior Publication Data
US 2007/0298153 A1 Dec. 27, 2007

(30) Foreign Application Priority Data
Dec. 2, 2004 (MX) .................. PA/A/2004/012039

(51) Int. Cl.
*A21D 10/00* (2006.01)
(52) U.S. Cl. ........ 426/549; 426/653; 426/426; 426/808; 426/391; 426/503; 426/496; 426/516; 426/518
(58) Field of Classification Search .................. 426/656, 426/549, 653, 391, 439, 446, 458, 496, 503, 426/560, 808, 504, 512, 516, 519, 518, 523, 451, 465, 473
See application file for complete search history.

(56) References Cited

U.S. PATENT DOCUMENTS

| | | | | |
|---|---|---|---|---|
| 4,308,286 A * | 12/1981 | Anstett et al. | ................... | 426/19 |
| 4,828,856 A * | 5/1989 | Willard | ........................ | 426/272 |
| 5,304,055 A * | 4/1994 | Van Lengerich et al. | ...... | 425/225 |
| 5,601,070 A * | 2/1997 | Hotard et al. | ................ | 126/21 A |
| 5,690,982 A * | 11/1997 | Fazzolare et al. | ............. | 426/550 |
| 5,804,233 A * | 9/1998 | Lonergan et al. | ............... | 426/19 |
| 6,180,151 B1 * | 1/2001 | Geng et al. | ..................... | 426/448 |
| 2003/0064145 A1 * | 4/2003 | Fannon | ......................... | 426/656 |

FOREIGN PATENT DOCUMENTS

| | | |
|---|---|---|
| EP | 0 296 039 | 12/1988 |
| EP | 0 338 239 | 10/1989 |
| WO | WO 97/08961 | 3/1997 |
| WO | WO 99/51111 | 10/1999 |

* cited by examiner

*Primary Examiner* — Drew E Becker
*Assistant Examiner* — Preston Smith
(74) *Attorney, Agent, or Firm* — Roylance, Abrams, Berdo & Goodman, L.L.P.

(57) ABSTRACT

This invention refers to a method for producing integrally flavored non-fried snacks, as well as the preparation thereof, in which upon internally flavoring the pellet, flavors prevail, since a cold-extrusion process similar to that used for producing pastas is used, wherein the temperature does not exceed 100° C., thereby flavors degrades not. In order to produce the snacks according to this, it is required to use pre-gelatinized flours. The flavored pellet undergoes a baking process at a high temperature during a short period of time. An internally flavored snack is produced, to which it is possible to add functional ingredients which would degrade using a normal extrusion process.

17 Claims, 4 Drawing Sheets

APROVAL GRAPH OF THE CINAMMON FLAVORED SNACK

METHOD FOR THE PRODUCTION OF INTEGRALLY FLAVORED NON-FRIED SNACKS

INVENTION FIELD

This invention refers to a method for the production of non-fried snacks, namely, a method for preparing non-fried snacks which are integrally flavored. This invention also refers to non-fried snacks which are integrally flavored.

PRIOR ART

At present, several processes for producing fried and non-fried snacks are known. It is common in the food industry that snacks are prepared with starch in a particular way. The resultant dough is cut and dried so that it may be then fried. The results of the above are snacks with high-fat rate.

For example, U.S. Pat. No. 6,432,463, disclosing a process to produce expandable pellets, specifically discloses the production of potato based expandable pellets by using a twin screw extruder, which improves the flavor quality and increases the oil absorption. One of the differences between the present invention and the above mentioned invention is that this invention uses a single-screw extruder for the pellet production. Hence, no oil absorption is done by the product from the present invention. Furthermore, the flavor of this invention is included within the composition of the snack.

Another document which discloses a method for snack production, is U.S. Pat. No. 3,971,859 titled "Technique for preparing edible food flavor pellets" which discloses the manufacture of pellets which are fried in peanut oil and coated with a flavored ingredient. The differences between this invention and the invention above mentioned are evident, since the snacks of this invention are non-fried and are internally flavored.

U.S. Pat. No. 3,857,977 titled "Food Flavor Pellets with wheat flour, soy flour and buttermilk base" discloses the production of a pellet or cube which is submitted to an extrusion process at high temperature and high pressure. Said patent is different from the present invention, since the process herein does not use fat components, and uses a low temperature and low pressure extrusion process.

In addition, another document disclosing a process for the production of snacks is U.S. Pat. No. 3,851,072 titled "Food flavor pellets with meat texture" which discloses a method and a composition for the preparation of cubes or pellets with a meat-like texture to be then incorporated into dehydrated food systems. The products of the above patent are extruded at high temperatures and high pressure in a determined time, to obtain products with a desired size and length. As was above mentioned, the present invention is not submitted to extrusion high temperatures nor high pressures.

U.S. Pat. No. 6,881,429 titled: "Method of extruding bread dough and products thereof" was also found, wherein a method of manufacturing an uncooked dough product by a cold-extrusion process not exceeding 60° C. is disclosed. The most significant difference between the above US patent and this invention is the type of baking, since the above US patent refers to a normal baking process, i.e., in a conventional oven; the baking in the present invention, is carried out by a device through which the intermediate product is impelled by a driver element, such as a screw, which allows the flow of hot air, causing that the intermediate product actuates as a boiling solid, suffering a thermal shock caused by the sudden evaporation of the water, resulting in a non-bubble texture, with randomly bonded gaps providing as a result a thicker product than the already-known snacks.

U.S. patent application Ser. No. 60/139,928 titled: "System of Food Delivery, Preparation and Consumption", refers to a system and method to deliver, prepare and consume semi-prepared products, which expand by an energetic source such as a microwave oven. The products are manufactured based on cereals, to produce cereals for breakfast or snacks. The method and product of the above mentioned application differ from the present invention since this invention refers to a ready-to-eat (RTE) product.

Therefore, a product using a low-temperature and low-pressure extrusion process is desirable, resulting into a low fat product.

Additionally, a process to manufacture snacks, wherein the process is carried out by a low-temperature and low-pressure extrusion, resulting into a low fat product is also desirable.

Hence, an object of this invention is a method of producing low-fat or non-fat snack products.

Another object of the invention, is a low-temperature and low-pressure extrusion process.

Also, another object of the invention is a method of making a snack product, wherein the snack product flavor arises from the snack composition.

A further object of this invention is that the method for producing the snack product leaves the product as a RTE product.

Another object of this invention is a snack which is low-fat or non-fat.

Another object of the invention is a snack product, produced by a low temperature and low pressure extrusion process.

Furthermore, another object of the invention is a snack product, where the snack product flavor arises from the snack composition.

Yet another object of the present invention is a RTE snack.

DETAILED DESCRIPTION OF THE INVENTION

This invention refers to a method for making an integrally flavored, non-fried snack, as well as the composition thereof, using natural materials which undergo a soft thermal process to maintain the food value thereof and retain the flavor added to the composition. Furthermore, the present invention refers to integrally flavored non-fried snacks, from natural materials, wherein the materials undergo a soft thermal processes to maintain the snack nutritive value and retain the snack flavor.

It should be understood as "integrally flavored", that the snack is flavored in the outer and inner surface.

The main element of these snacks in comparison to those of prior art, is the low-fat level and vegetal fiber provision thereof, retaining an excellent flavor product.

Figure 1:
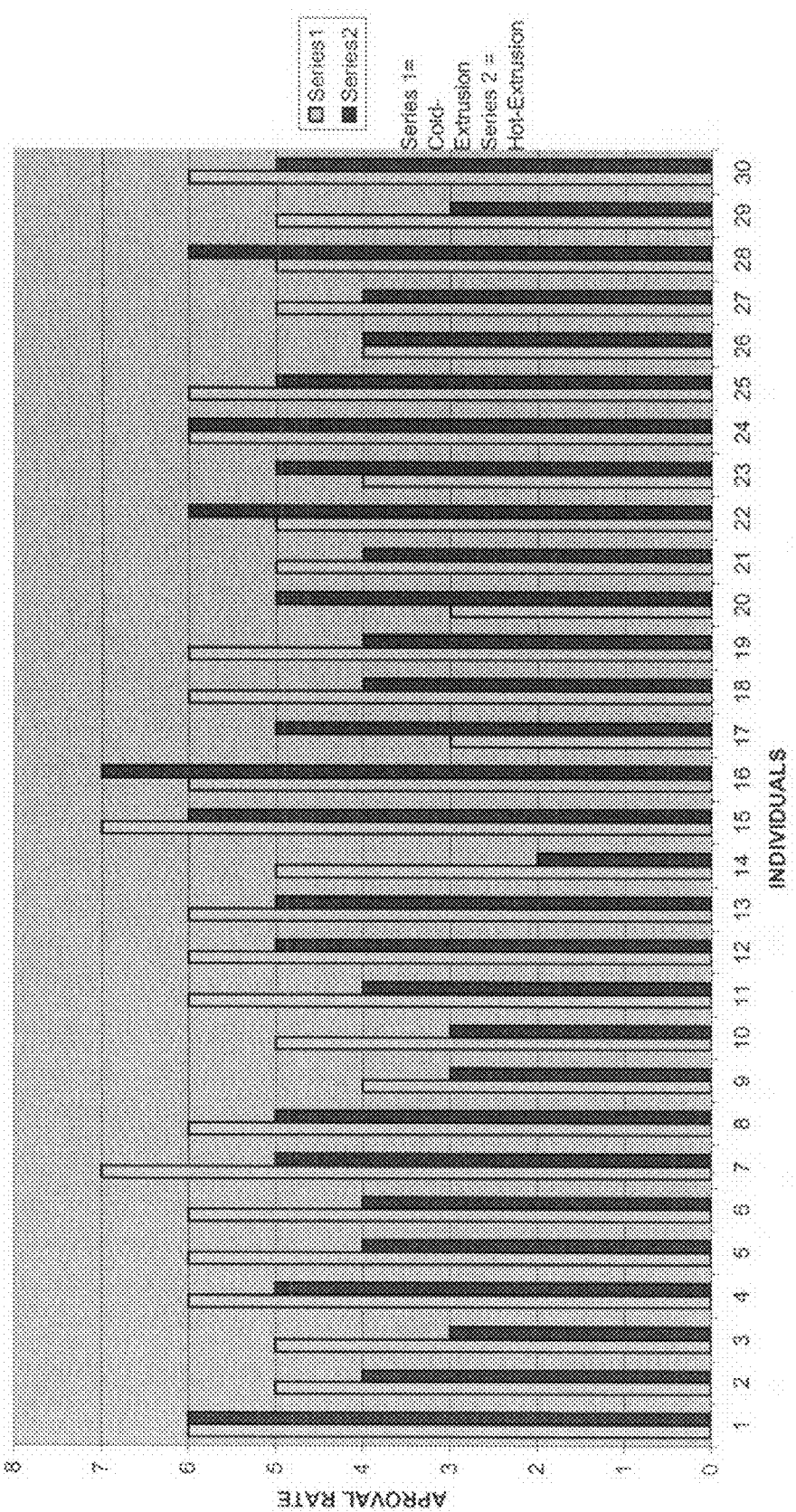
FIG. 1 shows an acceptation comparative test of two extruded and integrally flavored products.

FIG. 1 is an acceptance comparative test graph of two extruded and integrally flavored products, wherein one of the products was obtained by a normal extrusion process, while the other was obtained by the process of the present invention. Said figure shows the acceptance of the product by means of the method of the present invention. In said figure it may be seen that the snack of the present invention has greater acceptance since the flavor retention is higher in the process of this invention.

Figure 2:
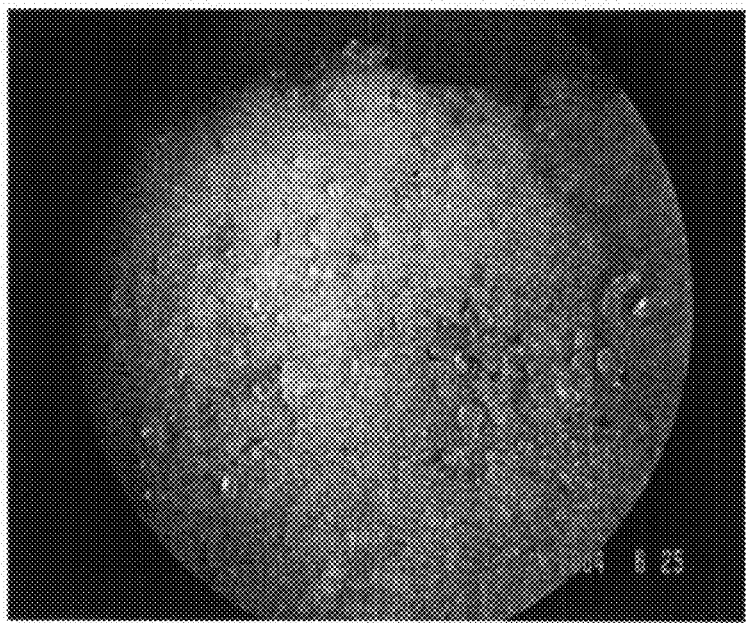
FIG. 2 is a microscope photography of the snack surface of this invention.

FIG. 2 is an amplified microscope photography of the surface of the snack produced by the method of the present invention in which it may be seen that the surface includes few air bubbles, and wherein the surface does not contain oil.

Figure 3:
FIG. 3 is a microscope photography of the snack interior of this invention.

FIG. 3 is an amplified microscope photography of the interior of the snack made by the method of the present invention, in which the flavor particles may be observed. As in FIG. 2, it may be seen from the present figure that few air bubbles are contained in the snack as well as the lack of oil in the snack.

Figure 4:
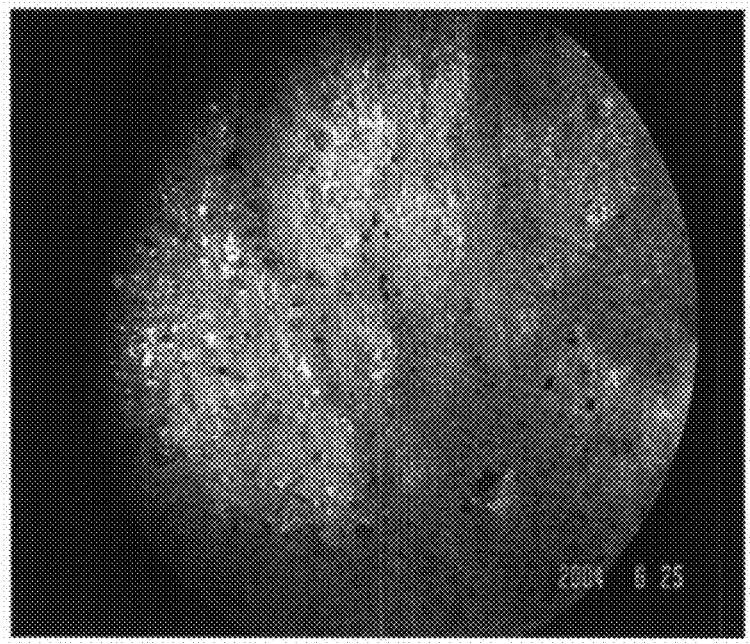
FIG. 4 is a microscope photography of the surface of an extruded, spicy snack from the prior art.

FIG. 4 is an amplified microscope photography of the surface of a snack extruded with the prior art process, by means of high pressure and temperature, wherein the snack is a spicy snack. In this figure it may be seen that the surface is covered by oil. Also, it may be seen that the texture of the texture of the surface is different from that of the snack produced by the method of the present invention, since said surface contains air bubbles and abundant oil. The surfaces may be compared by observing this figure versus FIG. 2.

Figure 5:
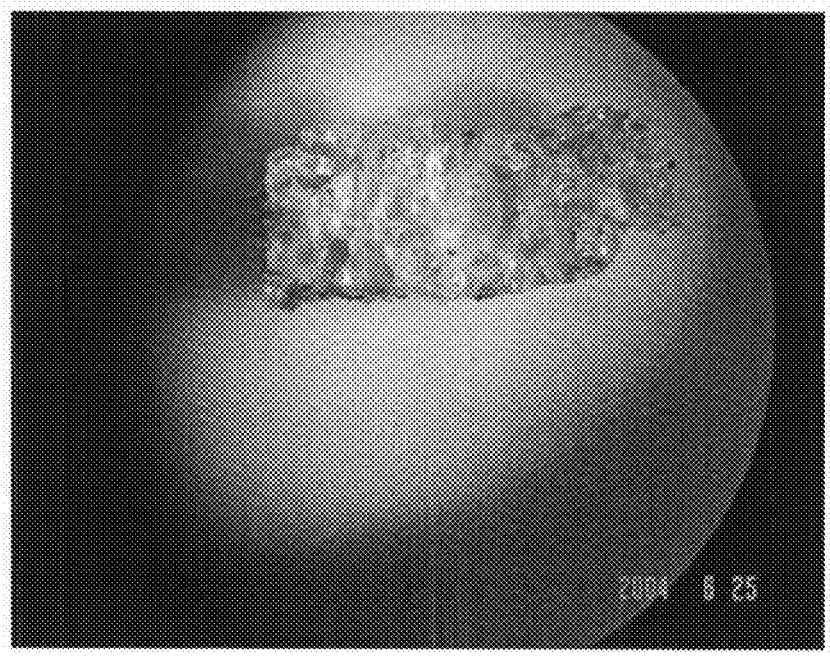
FIG. 5 is a microscope photography of the cross section of a spicy snack from the prior art.

FIG. 5 is an amplified microscope photography of a cross section of the snack extruded by the prior art process, by means of high pressure and temperature, wherein the snack is a spicy snack. In this figure it may be seen that the interior surface of the prior art snack, contains air bubbles and is covered by oil, resulting in a different texture from that of the snack of the present invention, as it may be seen when comparing FIG. 5 with FIG. 3.

FIGS. 2 and 5 show different characteristics of snacks obtained by a cold extrusion process and by a hot extrusion process.

FIG. 2 shows the front part of the snack of the present invention, which is obtained by a cold extrusion process, baked and flavored. This figure shows that the snack does not shine, which is typical in oil-fried snacks. The small granules which may be seen are characteristic of the sugar and powder flavoring. On the other hand, FIG. 4 shows the surface of a prior art snack, i.e., a fried snack. FIG. 4 it also shows red-yellow dots a characteristic pertaining to the spicy flavoring.

FIG. 3 shows the internal part of the cold-extruded, baked and seasoned snack. Said figure shows that the product contains few bubbles and is fat-free. On the contrary, FIG. 5 shows the internal part of the hot-extruded, fried and seasoned snack. As it may be observed from FIG. 5, the prior art snack contains shiny air bubbles; also in the edges of said prior art snack, the spicy condiment particles may be seen.

In prior art, upon the addition of flavors and water, the formation of dough previous to the hot extrusion process is caused, and further causing when extruding in pressures (higher than 100 bar) and temperatures (higher than 100° C.) generated within the extrusion chamber, that the flavors and scents of the extruded product to evaporate and/or degrade and/or alter.

The snack of the present invention is made by means of the unique process of the present invention. The snack of this invention includes pre-gelatinized flours, so the process may be carried out by cold extrusion. The cold extrusion is carried out by a single screw extruder with a cooling water jacket, a machine commonly used to produce pastas. The use of this machine for the snack of this invention has the advantage of not using temperatures higher than 100° C. in the internal part of the product, so that the scents and flavors of the ingredients are not degraded and/or altered, which are commonly transformed with high temperature.

The snack of the present invention includes originally chosen natural ingredients such as pre-gelatinized rice flour, Nixtamalized corn flour, sodium chloride, bicarbonate, sugar, oats fiber and soy flour, ascorbic acid, etc, as well as additives such as natural and/or artificial flavorings.

The cold-extrusion process necessarily uses pre-gelatinized flours.

The manufacturing method of the integrally flavored non-fried snacks of this invention includes the following steps:

1. Mixing the necessary ingredients, with an exact weight relation to obtain a desired taste, until obtaining an homogenous mixture, wherein the mixture may be carried out with a mixer at a speed of 20 to 60 rpm, during a determined period of time between 5 to 10 minutes;

2. Adding water to achieve a humidity of between 10% and 55% to obtain the desired conditions of the texture of the final product;

3. Mixing the initial composition with water, until these two are homogenized, wherein the second mixture may be carried out with a mixer at a speed of 20 to 60 rpm, during a determined period of time between 5 and 10 minutes, or until achieving a non-dry flour, wherein the result of this mixture is an homogenous flour;

4. Pouring the resulting homogenous flour into an extrusion chute;

5. Cold extruding the homogenous flour into an extruder, wherein said extruder is a single screw extruder with a cooling water jacket, obtaining a humid solid product;

6. Cutting the humid solid product, wherein said cutting may be done manually or by a pasta industrial cutter.

7. Placing the resulting cut humid solid product on the trayses of a drier;

8. Placing the trays in the drier, during a determined time, to reduce humidity between 5% and 20%, the time being variable and depending on the amount of the resulting product to be dried, thus obtaining an intermediate product;

9. Carefully taking out the trays and separating the dry product;

10. Baking the resulting intermediate product at a high temperature during a short time, the temperature may vary between 150 to 250° C. whilst the time may vary between 1 to 18 minutes depending on the amount the product to be baked, where the baking step is carried out by a means of a device through which the intermediate product is impelled by an impelling element, such as a screw. Said device allows the flow of air, i.e. the entrance and exit of hot air. The entrance and exit of hot air is generated in different ways, for example, by the combination of a blower and a heat source, originating that the intermediate product acts as a boiling solid, which suffers a thermal shock causing the sudden evaporation of the water within the product giving a texture with few to none bubbles, with randomly bonded gaps resulting in a thicker product;

11. Optionally flavoring with seasons the baked product, with one or several flavors to intensify the flavor and packing the resulting product.

Figure 6:
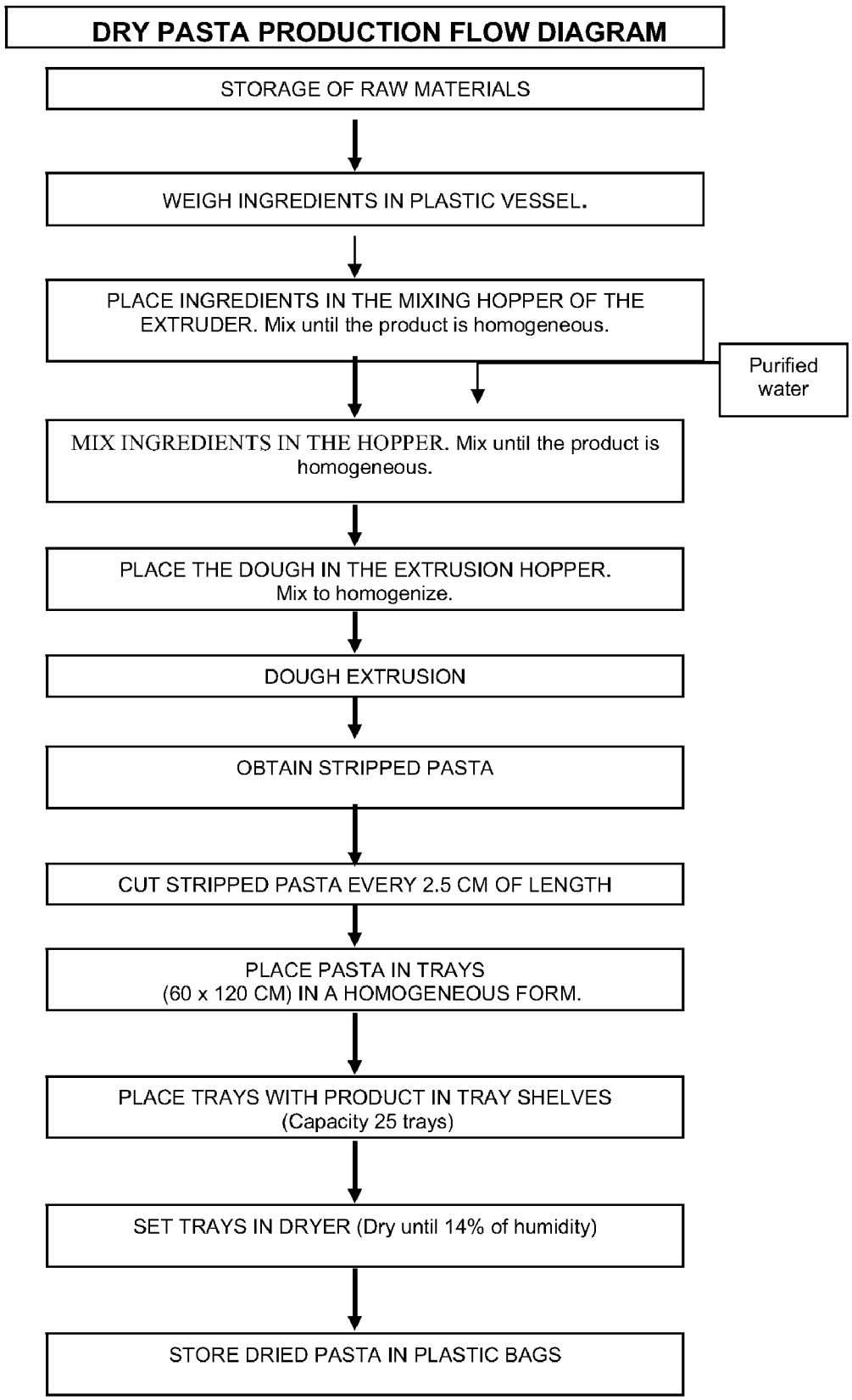
FIG. 6 is a flow chart of the method of manufacturing the homogenous flour of the non-fried, integrally flavored snack of the present invention.

FIG. 6, shows in a detailed manner the production of said dry homogenous flour by a flow chart, showing the steps to obtain the dry homogenous flour.

The characteristics of the described process allow obtaining a product of the integrally flavored non-fried snack of the present invention, with different food properties to those of the fried product and with different sensorial properties, such as texture, taste and scent. Additionally, the product is cheaper since it is not extruded at high temperatures. Finally, the product obtained from the process is a calorie and fat reduced snack, in comparison to the prior art oil-fried products, and achieving a better flavor retention in comparison to a product obtained by a hot extrusion process. Another advantage of the obtained product is that it has a longer shelf life, since it does not contain oil, which oxides easily.

COMPOSITION EXAMPLES

Several examples of the different compositions of the integrally flavored non-fried snack of the present invention are disclosed below. According to the above, the snack of the present invention varies in a great number of flavors, since the flavor of the base is neutral. The above also causes a great number of possible functional properties to exist.

Example 1

| Snack General Composition | |
|---|---|
| Ingredients | Percentage (% in weight) |
| Pre-gelatinized corn flour | 10.00-50.00 |
| Pre-gelatinized rice flour | 40.00-70.00 |
| SALT | 0.50-5.00 |
| Sodium Bicarbonate | 0.30-5.00 |
| Sugar | 0.00-25.00 |
| Fiber | 0.50-9.00 |
| Nixtamalized corn flour | 0.00-35.00 |
| Milk in powder | 0.00-17.00 |
| Flavoring | 0.00-25.00 |

Example 2

| Apple Flavored Snack Mixture (1) | |
|---|---|
| Ingredients | Percentage (% in weight) |
| Pre-gelatinized corn flour | 10.00-40.00 |
| Pre-gelatinized rice flour | 40.00-70.00 |
| Salt | 0.50-3.00 |
| Sodium Bicarbonato | 0.50-3.00 |
| Sugar | 5.00-25.00 |
| Fiber | 2.50-9.00 |
| Apple flavor | 5.00-25.00 |

Example 3

| Apple Flavored Snack Mixture (2) | |
|---|---|
| Ingredients | Percentage (% in weight) |
| Pre-gelatinized corn flour | 20-30 |
| Pre-gelatinized rice flour | 40-50 |
| Salt | 1-2 |
| Sodium Bicarbonate | 1-3 |
| Sugar | 10-20 |
| Fiber | 6-8 |
| Apple flavor | 5-20 |

Example 4

| Spicy-Lemon flavored Snack Mixture (1) | |
|---|---|
| Ingredients | Percentage (% in weight) |
| Pre-gelatinized corn flour | 20.00-50.00 |
| Pre-gelatinized rice flour | 40.00-60.00 |
| Salt | 0.50-5.00 |
| Sodium Bicarbonate | 0.80-2.50 |
| Nixtamalized corn flour | 5.00-35.00 |
| Fiber | 2.00-9.00 |
| Spicy-Lemon flavor | 5.00-15.00 |

Example 5

| Spicy-Lemon flavored Snack Mixture (2) | |
|---|---|
| Ingredients | Percentage (% in weight) |
| Pre-gelatinized corn flour | 25 to 35 |
| Pre-gelatinized rice flour | 40 to 50 |
| Salt | 1 to 3 |
| Sodium Bicarbonate | 1.50 to 2.50 |
| Nixtamalized corn flour | 25 to 35 |
| Fiber | 5 to 9 |
| Spicy-Lemon flavor | 10 to 15 |

Example 6

| Cheese flavored Snack Mixture (1) | |
|---|---|
| Ingredients | Percentage (% in weight) |
| Pre-gelatinized corn flour | 20.00-50.00 |
| Pre-gelatinized rice flour | 40.00-60.00 |
| Salt | 0.50-5.00 |
| Sodium Bicarbonate | 0.80-4.00 |

Cheese flavored Snack Mixture (1)

| Ingredients | Percentage (% in weight) |
| --- | --- |
| Nixtamalized corn flour | 3.00-25.00 |
| Fiber | 2.00-9.00 |
| Cheese flavor | 5.00-17.00 |

Example 7

Cheese flavored Snack Mixture (2)

| Ingredients | Percentage (% in weight) |
| --- | --- |
| Pre-gelatinized corn flour | 25 to 35 |
| Pre-gelatinized rice flour | 45 to 55 |
| Salt | 1 to 3 |
| Sodium Bicarbonate | 3 to 4 |
| Nixtamalized corn flour | 10 to 15 |
| Fiber | 2 to 4 |
| Cheese flavor | 5 to 6 |

Example 8

Chocolate flavored Snack Mixture (1)

| Ingredients | Percentage (% in weight) |
| --- | --- |
| Pre-gelatinized corn flour | 10.00-40.00 |
| Pre-gelatinized rice flour | 40.00-70.00 |
| Salt | 0.50-3.00 |
| Sodium Bicarbonate | 0.50-3.50 |
| Milk in powder | 2.00-17.00 |
| Sugar | 5.00-25.00 |
| Fiber | 2.50-9.00 |
| Chocolate flavor | 5.00-25.00 |

Example 9

Chocolate flavored Snack Mixture (2)

| Ingredients | Percentage (% in weight) |
| --- | --- |
| Pre-gelatinized corn flour | 10 to 20 |
| Pre-gelatinized rice flour | 40 to 50 |
| Salt | 3 to 5 |
| Sodium Bicarbonate | 0.50 to 2 |
| Milk in powder | 1 to 2 |
| Sugar | 8 to 14 |
| Fiber | 5 to 8 |
| Chocolate flavor | 10 to 20 |

The above-mentioned examples show that pre-gelatinized flours occupy a substantial portion of the mixture. Pre-gelatinized flours are usually divided into corn pre-gelatinized flours and rice pre-gelatinized flours. However, rice pre-gelatinized flour may be substituted by any pre-gelatinized cereal, pre-gelatinized tubercle or pre-gelatinized leguminous. These ingredients occupy a considerable portion of the snack composition since the mixture is previously submitted through a gelatinization process, so that the role of the flour native starch is gelatinizing.

The gelatinization process requires submitting the native flours to a gelatinization thermal process. Said gelatinization is due to the starch from the flours. The above results in an excellent raw material to extrude by means of a cold extrusion process. Therefore, temperatures higher than 100° C. are avoided, and hence, flavors incorporated to the dough are retained before said dough is cold-extruded.

Sensorial Evaluation Comparative Test in an Extruded Product by a Cold Extrusion Process and a Hot Extrusion Process.

The results from the sensorial evaluation of the samples produced in a Wenger X5® extruder and those obtained from a cold-extrusion process in a Montferrina® are herein shown. The sensorial tests were carried out with 30 individuals, of both, female and male sexes, with oscillatory ages between 22 and 24 years old.

The object of the test is observing the cold-extrusion process and hot-extrusion process effect, in regards to the flavor incorporated to the flour mixture, prior to the process thereof. The process conditions are as follows:

I) The cold-extrusion process was carried out without thermal treatment.
II) The hot-extrusion process was carried out with a single-screw Wenger X-5® extruder, according to Table I:

APPLE-CINAMMON FLAVORED SNACK

| Mixture | Humidity | Zone I | Zone II | Zone III | Zone IV | Raw Weight | Weight (baked) |
| --- | --- | --- | --- | --- | --- | --- | --- |
| Normal with flavor Original (Mix 1) | 26% | 100° C. | 100° C. | 100° C. | 125° C. | 138 g | 119.4 g |
| Normal with Flavor Original Mix (2) | 28% | 100° C. | 100° C. | 100° C. | 125° C. | 88.8 g | 76 g |

For the sensorial analysis, an "Added-level Test" using a random numeric code to identify the samples at a 7-points scale was used, wherein 1 corresponds to "I dislike it"; 2 corresponds to "I moderately dislike it"; 3 corresponds to "I lightly dislike it"; 4 to "I do not like it, nor do I like it"; 5 to "I lightly like it"; 6 to "I moderately like it" and 7 to "I like it very much".

The test results were made with a cinnamon flavored snack, in a cold-extrusion vs. hot-extrusion, wherein a "t" student distribution was used (95% trust, two tails):

"T STUDENT DISTRIBUTION"

$$t = \frac{\Sigma D}{\frac{\sqrt{n \Sigma D^2 - (\Sigma D)^2}}{n-1}}$$

$n = 30$ wherein $D = \sum \text{Evaluation 1} - \sum \text{Evaluation 2}$, i.e., -continued $$t = \frac{\sum (\text{cold extrusion}) - \sum (\text{hot extrusion})}{\frac{\sqrt{30(68) - (-24)^2}}{29}}$$

$$t = \frac{-24}{\frac{\sqrt{30(68) - (-24)^2}}{29}}$$

$$= \frac{-24}{\frac{\sqrt{2040 - 576}}{29}}$$

$$= \frac{-24}{\sqrt{50.48}}$$

$$t = \frac{-24}{7.1051} = -3.37$$

$$t_{tables} = 2.045$$

Then $t_{cal} > t_{tables}$

Evaluation of Different Flavored Snacks Manufactured by Two Different Processes: Cold-Extrusion and Hot-Extrusion

| JUDGE | EVALUATION 1 CINAMMON IN COLD | EVALUATION 2 CINAMMON IN HOT |
|---|---|---|
| 1 | 6 | 6 |
| 2 | 5 | 4 |
| 3 | 5 | 3 |
| 4 | 6 | 5 |
| 5 | 6 | 4 |
| 6 | 6 | 4 |
| 7 | 7 | 5 |
| 8 | 6 | 5 |
| 9 | 4 | 3 |
| 10 | 5 | 3 |
| 11 | 6 | 4 |
| 12 | 6 | 5 |
| 13 | 6 | 5 |
| 14 | 5 | 2 |
| 15 | 7 | 6 |
| 16 | 6 | 7 |
| 17 | 3 | 5 |
| 18 | 6 | 4 |
| 19 | 6 | 4 |
| 20 | 3 | 5 |
| 21 | 5 | 4 |
| 22 | 5 | 6 |
| 23 | 4 | 5 |
| 24 | 6 | 6 |
| 25 | 6 | 5 |
| 26 | 4 | 4 |
| 27 | 5 | 4 |
| 28 | 5 | 6 |
| 29 | 5 | 3 |
| 30 | 6 | 5 |
| ? | 161 | 137 |
| X | 5.36 | 4.56 |

As it may be observed from the test results, the cold-extrusion snack had a substantially higher approval than the hot-extrusion snacks.

While the invention has been disclosed in regard to the preferred embodiments and the invention practices, this invention is not to be limited by the embodiments herein described, on the contrary, it is intended to cover several equivalent modifications and arrangements included within the spirit of the claims herein, in order to cover all the equivalent modifications and structures permitted by law.

The invention claimed is:

1. A method for the production of an integrally flavored snack type food product, comprising:
   a. mixing pre-gelatinized flour and non-pre-gelatinized ingredients, with a determined weight relation to obtain an homogenous mixture;
   b. adding water to said homogenous mixture, to achieve a moisture content in said homogeneous mixture of between 10% and 55% humidity, to produce a homogenous flour;
   c. subjecting said homogenous flour to cold extrusion in a pasta-style single screw extruder with a cooling water jacket to form a cold extruded homogeneous moist solid product;
   d. drying said moist, solid product to achieve a moisture content of between a 5% and 20% humidity, yielding an intermediate product; and
   e. baking said intermediate product at temperatures of between 302° F. to 482° F. (150° C. to 250° C.) during a 1 to 18 minute time period, allowing the flow of hot air causing the water of the intermediate product to boil, obtaining a texturized non-fried food product.

2. The method of claim 1, wherein step (a) is carried out in a mixer at a speed of 20 to 60 rpm during a determined time between 5 to 10 minutes.

3. The method of claim 1, wherein step (b) is carried out in a mixer at a speed of 20 to 60 rpm during a determined time between 5 to 10 minutes.

4. The method of claim 1, wherein the cold extruded homogenous humid solid product is subjected to a cutting step.

5. The method of 4, wherein said cutting step is carried out manually.

6. The method of 4, wherein said cutting step is carried out by means of an homogenous pasta industrial cutter.

7. The method of claim 4, wherein the cut homogeneous humid solid product is placed in drier trays to carry out step (d).

8. The method of claim 1, wherein the time of step d varies depending on the amount of the humid solid product to be dried.

9. The method of claim 1, wherein the step of seasoning the baked product with one or several flavors, after step (e) is additionally carried out.

10. The method of claim 1, wherein the step of packing the baked product is additionally carried out.

11. The method of claim 1, wherein said homogenous flour from step (b) is passed to an extrusion chute for the extruder of step (c).

12. The method of claim 1, wherein said homogeneous mixture comprises ingredients selected from the group consisting of sodium chloride, sodium bicarbonate and sugar and wherein the pre-gelatinized ingredients are selected from the group consisting of pre-gelatinized cereal, pre-gelatinized tuber and pre-gelatinized fabaceae.

13. The method of claim 1, wherein said homogeneous mixture contains pre-gelatinized flour in the amount of between 50 and 98.7 weight % of the total weight of the food product.

14. A method for the production of an integrally flavored snack food product, comprising:
   a. mixing pre-gelatinized flour and non-pre-gelatinized ingredients to form a homogenous mixture, said homogeneous mixture including flavoring and scents;

b. adding water to said homogenous mixture to achieve a moisture content in said homogeneous mixture of between 10% and 55% and produce a homogenous flour;

c. subjecting said homogenous flour to cold extrusion in a single screw extruder provided with a cooling water jacket to remove heat during the extrusion process and provide a cold-extruded homogeneous moist solid product without degrading said flavoring or scents during the cold extrusion process;

d. drying said moist solid product to achieve a moisture content of between 5% and 20%, yielding an intermediate product; and e. baking said intermediate product at a temperature of between 150° C. to 250° C. for 1 to 18 minutes, allowing the flow of hot air causing the water of the intermediate product to boil, and obtaining a texturized non-fried food product.

15. The method of claim 14, wherein said homogeneous mixture contains pre-gelatinized flour in the amount of 50 to 98.7 weight % of the total weight of the food product.

16. The method of claim 14, wherein, said flavoring is selected from the group consisting of apple flavor, spicy-lemon flavor, cheese flavor and chocolate flavor.

17. A method for the production of an integrally flavored snack food product, comprising:

a. mixing pre-gelatinized flour and non-pre-gelatinized ingredients to form a homogenous mixture, said mixture containing said pre-gelatinized flour in an amount of between 50 and 98.7 wt. % based on the total weight of said homogeneous mixture;

b. adding water to said homogenous mixture to achieve a moisture content in said homogeneous mixture of between 10% and 55% and produce a homogenous flour;

c. subjecting said homogenous mixture to cold extrusion in a single screw extruder with a cooling water jacket, such that said cold extrusion is similar to the cold extrusion process used for producing pastas, said homogeneous mixture thereby forming an extruded homogenous, moist solid product;

d. drying said moist solid product to achieve a moisture content of between 5% and 20%, yielding an intermediate product; and e. baking said intermediate product at a temperature of between 150° C. to 250° C. for 1 to 18 minutes, allowing the flow of hot air causing the water of the intermediate product to boil, and obtaining a texturized non-fried food product.

* * * * *